UNITED STATES PATENT OFFICE.

LUMAN HUMPHERY GASKILL, OF SAN DIEGO, CALIFORNIA.

COMPOUND FOR PRESERVING WOOD, &c.

No. 836,316.

Specification of Letters Patent.

Patented Nov. 20, 1906.

Application filed May 31, 1906. Serial No. 319,582.

*To all whom it may concern:*

Be it known that I, LUMAN HUMPHERY GASKILL, a citizen of the United States, residing at San Diego, in the county of San Diego and State of California, have invented certain new and useful Improvements in Compounds for Preserving Wood, &c.; and I do hereby declare the following to be a full, clear, and exact description of the invention, such as will enable others skilled in the art to which it appertains to make and use the same.

This invention relates to new and useful improvements in compounds for preserving wood and other substances, and comprises a composition of various ingredients which when applied to wood will have a tendency to prevent the same from rotting, or when applied to metal serving to prevent corrosion.

My compound comprises the utilization of crude petroleum, marl, resin, and wood fiber, such as sawdust.

In preparing my compound I take four parts of resin and one part of petroleum and heat and fuse the same until the resin is thoroughly dissolved, after which seven parts of marl are stirred into the mixture and thoroughly boiled, after which one part of wood fiber or sawdust is added to the other ingredients and still boiled longer, preferably for a half-hour.

A compound made in accordance with my invention will be found to be an excellent coating for wood to prevent the same from rotting or for covering metal to prevent corrosion of pipes, conduits, &c.

What I claim is—

A composition for preserving wood, metal, &c., comprising seven parts of marl, four parts of resin, and one part each of petroleum and wood fiber, compounded in the manner set forth.

In testimony whereof I hereunto affix my signature in the presence of two witnesses.

LUMAN HUMPHERY GASKILL.

Witnesses:
JNO. P. BURT,
CHAS. C. NORRIS.